July 27, 1926.  
J. CLIFFORD  
AUTOMOBILE LOCK  
Filed July 20, 1925
1,594,091
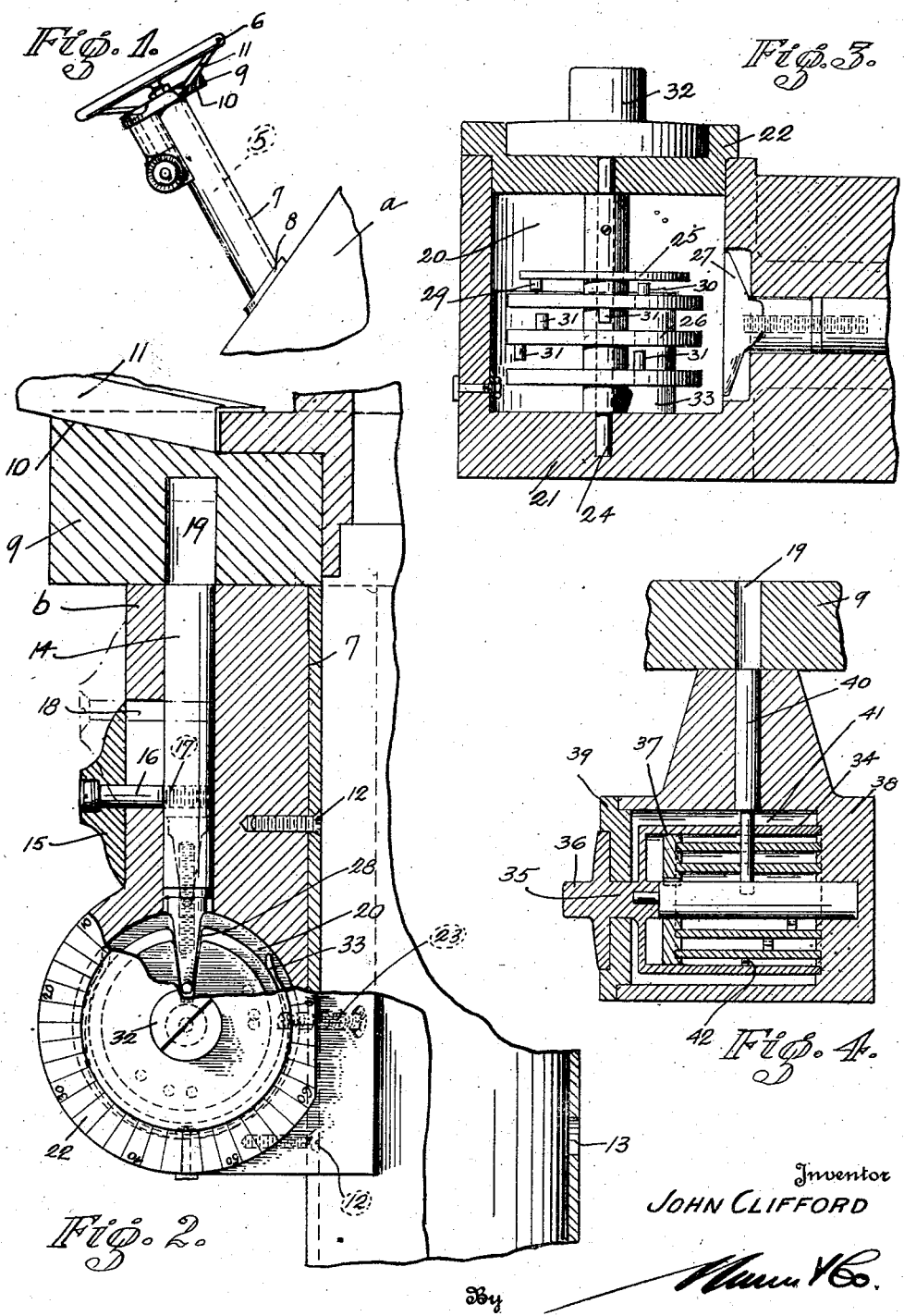
Inventor  
JOHN CLIFFORD
By  
Attorneys.

Patented July 27, 1926.

1,594,091

UNITED STATES PATENT OFFICE.

JOHN CLIFFORD, OF OAKLAND, CALIFORNIA.

AUTOMOBILE LOCK.

Application filed July 20, 1925. Serial No. 44,843.

The present invention relates to improvements in locks and particularly to locks adapted for use in connection with the steering apparatus of motor vehicles.

The general object of the invention is to provide for locking the steering wheel of a motor vehicle by the elements of a permutation lock and thereby avoid the necessity of having to depend upon a proper key for operating the lock in the acts of locking and unlocking the vehicle.

The above and other objects are accomplished by instrumentalities pointed out in the following specification.

The invention is clearly defined in the claim.

A satisfactory embodiment of the invention is illustrated in the accompanying drawings forming part of the specification and in which—

Figure 1 is a side elevation of the device in use.

Figure 2 is an enlarged detail partly in central vertical section and side elevation of the lock and its support, portions of the latter being broken away to disclose the relation of other parts.

Figure 3 is a view taken through the lock chamber and a portion of the bolt chamber of the lock casing with the device arranged horizontally with respect to Figure 2, and Figure 4 is a vertical cross section of a modified form of the device.

In the drawing $a$ indicates a fragment of a stationary part of a motor vehicle as, for instance, the instrument board located in front of the driver's seat. The steering post shown by dotted lines and indicated by 5 extends upwardly and obliquely through the instrument board and is operated to turn by the usual steering wheel 6 rigidly secured thereto. In carrying out the present invention, I provide a tubular casing 7 which receives the post 5 and acts as a housing therefor. The casing 7 is stationary and its lower end is bolted or otherwise secured as indicated by 8 to the instrument board $a$. The upper end of the casing 7 terminates below the hub of wheel 6 so that a clearance is provided for the metallic disk shaped keeper 9 which has a central opening for the reception of post 5 and is supported for rotation by the upper end of sleeve 7. The upper face of disk 9 has a number of radial grooves or depressions 10 which provide seats for the arms or spokes 11 of wheel 6 which are held tightly nested therein by the supporting action of sleeve 7. This construction operates to secure the disk and wheel together so that they will turn as a unit.

On the side of the casing 7 adjacent to the driver, as shown in Figure 1, a casting $b$ is rigidly secured to the casing as by screws 12—12. It will be noted by reference to Figure 2 that the lower of the screws 12 is disposed in alinement with an opening 13 formed in the opposite portion of casing 7. A similar opening (not shown) is disposed opposite the upper of the screws 12. These openings permit a screw driver or suitable implement to be passed transversely through casing 7 and into engagement with the screws 12 in the operation of securing the casting $b$ to the casing or in detaching the casting therefrom, and when the casing is removed from the post 5. The peculiar location of screws 12—12 renders these invisible and inaccessible when the casing is arranged in operative position as shown in Figure 1, and thus detachment of the casting $b$ from the casing 7 is prevented without first removing the casing 7 from its position around the post 5.

The upper end of casting $b$ is disposed approximately in contact with the lower face of disk 9 so as to prevent the introduction of an implement having sufficient formidability to displace the parts, and the inner surface of the casing is curved to conform with the curvature of the casing 7. The upper portion of the casting $b$ is bored in the direction of its length so as to provide an open-ended bolt chamber for the reception of the bolt 14 which is movable endwise in the chamber by a manually operable button 15, the shank 16 of which is suitably connected to the bolt 14 as by screw threads 17 and which extends through a vertical slot 18 in the front face of the casting, the length of the slot 18 being such that the upper end of the bolt may be projected into a recess 19 when the button is moved upwardly and retracted into the casting when the button is moved downwardly in the slot 18. The lower end of the bolt chamber is in open communication with a transversely disposed lock chamber 20 which is permanently closed at one end by an end wall 21 and closed at its opposite end by a removable cover 22 which is detachably secured to the side wall of the chamber by one or more screws 23 which are screwed into obliquely disposed openings extending through the curved bearing surface of the casting and into the cover 22 as shown in Figure 2. Centrally disposed bearings are formed in the head 22 and end wall 21 for the opposite end portions of a shaft 24 to which is fixedly secured a tumbler disk 25, a plurality of tumbler disks 26 are loose upon shaft 24 and arranged in spaced relation one to the other and to the tumbler disk 25. The peripheral portions of the disks 25 and 26 extend across the lower end of the chamber for bolt 14 and the inner or lower end of the bolt 14 is provided with an oblong head 27 wholly disposed within the lock chamber 20. The disks 25 and 26 are provided with detents 28 which when turned into alinement with one another and arranged to extend upwardly and in alinement with the bolt chamber, provide a passage for the reception of the end portion 27 of the bolt 14. When the bolt 14 is projected into the recess 19, the lower end 27 is elevated from the detent 28 and arranged so as to bear upon the peripheries of the disks 25 and 26 when these are turned so as to move their detents out of alinement with one another, and with the lower end 27. In turning the shaft 24 the movement of disk 25 is transmitted to the adjacent disk 26 when a pin 29 on disk 25 abuts a pin 30 on the adjacent face of disk 26 and in like manner pins 31 on the opposed faces of the other disks transmit thereto the rotary movement of the shaft 24. The various pins are arranged in predetermined relation to the detents and may as is usual in permutation locks be adjusted into various different positions with respect to the detents and to the graduations of a circular scale formed on the outer face of a knob 32 which is rotatable in a depression in the outer face of the cover 22 and rigidly secured to the shaft 24 so as to rotate the same. When the several pins are arranged to conform to a predetermined combination of numbers and turns, then alinement of the detents in the position shown in Figure 2 will not be had until the several disks have been successively manipulated in accordance with the requirements of the combination so that when the bolt 14 is projected into the recess 19 of the disk 9 and the detents moved out of alinement, the wheel 10 is locked against turning movement and can only be liberated by retracting bolt 14 which is permitted only by a proper manipulation of the knob. A leaf spring 33 is adapted to bear on the periphery of the tumbler disk farthest removed from cover 22 and thus prevent accidental turning movement or overthrow of this disk which is the first to be set in unlocking position by the turning of knob 32.

In Figure 4 I have shown a modified form of permutation lock as comprising a series of concentrically disposed cylinders 34 arranged one within the other and functioning as tumblers. The outer of these cylinders is rigidly connected to shank 35 of the operating knob 36 and is interiorly provided with a circular wall 37 having concentric grooves for the reception of one end of the inner cylinders. The outer ends of all the cylinders are slidably fitted in concentric grooves in the permanent end wall 38 and withdrawal of the cylinders and the knob is prevented by the detachable cover 39 secured to the wall of the lock chamber in any preferred manner as, for instance, that described in connection with cover 22 in Figures 2 and 3. The bolt 40 is slidable in an open-ended bolt chamber communicating at one end with the recess 19 of disk 9 and at its opposite end with the lock chamber 41 in which the cylinders are disposed. The opposed faces of the cylinders are provided with pins 42 which transmit the movement of the knob 35 to the various cylinders. The cylinders have transverse openings which aline one with the other when a predetermined number of turns for predetermined distances are given the said cylinders and when so alined the openings receive the inner end portion of bolt 40. An operating button similar to the button 15 previously described is employed for projecting the bolt 40 into the recess 19 of disk 9.

Although I have shown and described one embodiment of my invention, it is to be understood that the same is susceptible of various changes; and I reserve the right to employ such as may come within the scope of the appended claim.

I claim:

In combination, a revolvably mounted steering post terminating at one end in an operating element, a stationary hollow casing surrounding the steering post, a casting, screws threaded into the casting from the inside of the casing allowing the steering post to prevent unthreading of the same, a bolt mounted in the casting with freedom of axial motion and adapted to interlock with the operating element and a plurality of elements disposed relative to the bolt so as to allow the latter to be retracted only when arranged in a predetermined order.

JOHN CLIFFORD.